United States Patent [19]

Geiger

[11] Patent Number: 4,673,852
[45] Date of Patent: Jun. 16, 1987

[54] DEVICE FOR THE ELECTRIC LOW-VOLTAGE DRIVING OF A ROTATABLE MASS HAVING HIGH INERTIA AND A MOTOR WHICH IS PART OF SAID DEVICE

[75] Inventor: Jean-François Geiger, Colombes, France

[73] Assignee: S.A.M.M.-Societe D'Applications des Machines Motrices, Issy Les Moulineaux, France

[21] Appl. No.: 698,501

[22] Filed: Feb. 5, 1985

[30] Foreign Application Priority Data

Feb. 6, 1984 [FR] France .................. 84 01 777

[51] Int. Cl.⁴ .................................. H02P 7/30
[52] U.S. Cl. .................................. 318/341; 318/139; 318/617; 318/254; 310/181
[58] Field of Search ............ 318/314, 316, 317, 318, 318/139, 326, 327, 328, 254, 257, 599, 341, 614, 616, 617, 618, 430, 432, 439, 434; 310/154, 180, 181, 68 R; 363/124, 039

[56] References Cited

U.S. PATENT DOCUMENTS

| | | | |
|---|---|---|---|
| 3,538,412 | 11/1970 | Graf et al. | 318/257 X |
| 3,566,251 | 2/1971 | Hoglund | 310/181 X |
| 3,617,844 | 11/1971 | Grygera | 318/327 X |
| 3,707,638 | 12/1972 | Nailen | 310/152 |
| 3,753,068 | 8/1973 | Walker, Jr. | 310/181 X |
| 3,984,711 | 10/1976 | Kordik | 310/154 X |
| 4,019,107 | 4/1977 | Dixon et al. | 318/432 X |
| 4,028,601 | 6/1977 | Peterson | 318/430 X |
| 4,119,897 | 10/1978 | Skoog | 318/434 X |
| 4,217,513 | 8/1980 | Kohzai et al. | 310/154 X |
| 4,268,781 | 5/1981 | Kawada et al. | 318/432 X |
| 4,268,782 | 5/1981 | Kawada et al. | 318/434 |
| 4,305,024 | 12/1981 | Kuroki | 318/254 |
| 4,329,636 | 5/1982 | Uchida et al. | 318/254 X |
| 4,412,158 | 10/1983 | Jefferson et al. | 318/257 |
| 4,441,043 | 4/1984 | DeCesare | 310/46 |
| 4,445,061 | 4/1984 | Jackson, Jr. | 310/181 X |
| 4,471,281 | 9/1984 | Uezumi et al. | 318/318 X |
| 4,476,417 | 10/1984 | Zimmermann | 318/317 X |
| 4,481,448 | 11/1984 | Bishop | 318/245 X |
| 4,489,258 | 12/1984 | Kahlen et al. | 318/326 X |
| 4,546,293 | 10/1985 | Peterson et al. | 318/138 X |

Primary Examiner—William M. Shoop, Jr.
Assistant Examiner—Shik Luen Paul Ip
Attorney, Agent, or Firm—Sughrue, Mion, Zinn, Macpeak and Seas

[57] ABSTRACT

An electric device for driving a rotatable mass having a high inertia, said device comprising an electric motor supplied with power by a low-voltage dc source through an electronic energy converter supplying power to the armature (11) of the motor; the field system of the motor (12) comprises magnets (14) and excitation coils (16), the electric conductor of a coil being wound around its pole piece (18) along surfaces parallel to the corresponding yoke portion (19); this device further comprises an electronic system for regulating the current in the coils (16) and capable of maintaining during accelerations and decelerations a maximum output voltage of the converter within a wide range of speeds and therefore a maximum power; the increase in the intensity of the current in the coils (16) progressively decreases the torque coefficient of the motor which is maximum when the coils (16) are not supplied with power.

14 Claims, 14 Drawing Figures

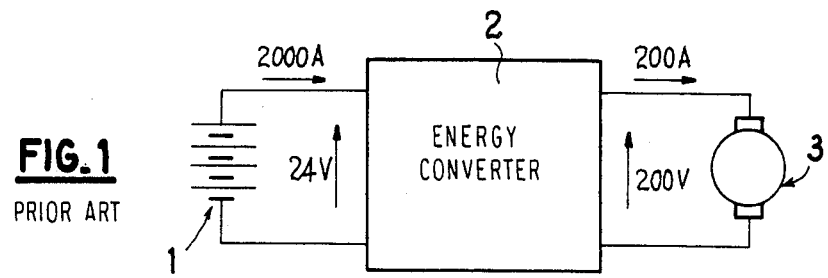
FIG.1 PRIOR ART
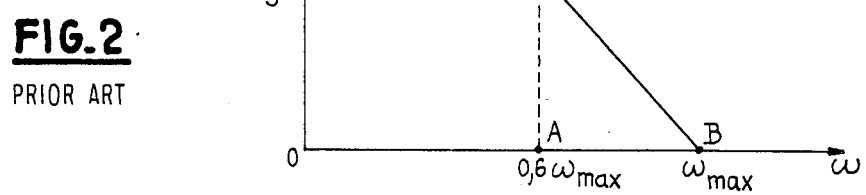
FIG.2 PRIOR ART
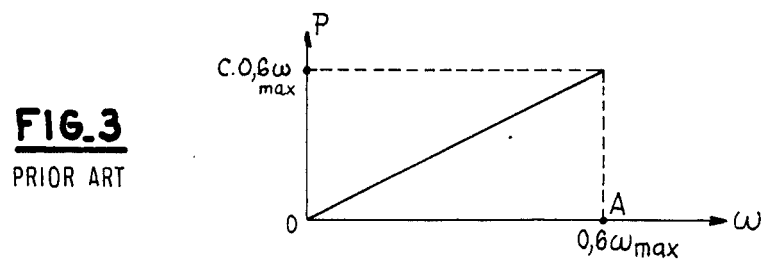
FIG.3 PRIOR ART
FIG.4 PRIOR ART
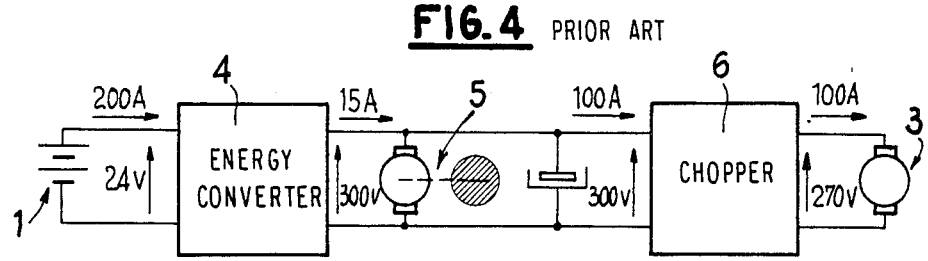

DEVICE FOR THE ELECTRIC LOW-VOLTAGE DRIVING OF A ROTATABLE MASS HAVING HIGH INERTIA AND A MOTOR WHICH IS PART OF SAID DEVICE

The present invention relates to a device for electrically driving a rotatable mass of high inertia, said device comprising an electric motor supplied with power by a low-voltage dc source, for example a 24 V battery through an electric energy converter adapted to supply power to the armature of the motor and a regulated supply which controls the field system.

The invention also relates to the electric motor which is part of this device.

The main, but not exclusive, field of application of this device is the control of the rotation of heavy ground machines: turrets of cruiser tanks, anti-aircraft systems, large-calibre gun mounts or carriages. The invention may also be applied to the control of naval guns.

The problem to be solved is that of the aiming of the main weapon (tank guns) by means of a motor, this weapon being part of a pivotable mass capable of being oriented in sight (or elevation) in the vertical plane. In the horizontal direction, the pivotal mass is connected to the rotatable mass (tank turret) which aims the weapon in azimuth (or lateral deflection).

The rotatable mass also supports, in addition to tne weapon, the munitions, the firing conducting system, motor-speed reducers, the crew of the machine and the protective armour.

The whole represents a total mass which may exceed 15 tons, the mechanism of which must at the present time satisfy simultaneously several requirements:

effect rapid movements of rotation so as to orient the gun onto the target within a short period;

aim the weapon in a precise manner relative to the line of sight, in the three directions of space, so as to ensure a precise shot;

aim at very low speeds, it being possible for the target to move slowly at a great distance (exceeding 1,000 meters);

overcome the rapid mechanical disturbances produced on the turret by the carrying vehicle travelling over uneven ground;

compatibility with the existing source of energy (i.e. a 24 V dc supply with batteries in a large majority of chassis employed throughout the world).

The known motorized units for aiming guns are, at the present time, constructed in accordance with two technologies; a hydraulic technology and an electric technology.

The present invention relates exclusively to entirely electric control systems in which the available source of energy usually delivers a mean dc voltage of 24 V and is usually formed by a generator associated with batteries connected as a buffer. Their capacity is between 300 Ah and 500 Ah for heavy tanks.

With this source of dc current, the motor driving the turning and pivotable masses may be supplied with high-voltage or low-voltage power. In order to facilitate the understanding of the description of prior devices, the latter have been diagrammatically shown in FIGS. 1 to 6.

The features and advantages of the invention will be described with reference to FIGS. 7-14.

FIG. 1 is a simplified electric diagram of a known device for controlling the rotatable mass with high voltage;

FIG. 2 is a diagram representing the acceleration as a function of the speed of rotation of the rotatable mass driven by a system according to FIG. 1;

FIG. 3 is a diagram showing the variation in the power supplied by the motor as a function of the speed of rotation of the rotatable mass, for the driving system diagrammatically shown in FIG. 1;

FIG. 4 is a simplified electric diagram of a second known high-voltage driving device;

Figure 5:
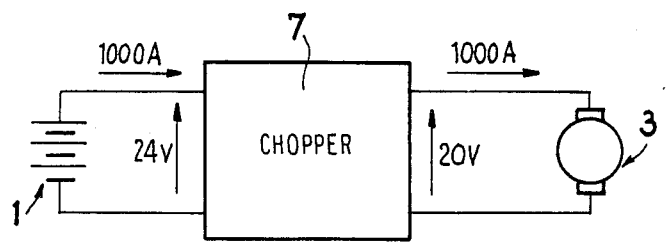
FIG. 5 is a simplified electric diagram of a known low-voltage driving device.

(1) High-voltage control of the rotation of the rotatable mass:

(a) The initial voltage of 24 V is amplified (for example to 200 V) by means of a rotating unit comprising a motor and an amplifying generator (metadyne). The variation in the supply voltage supplied for varying the speed of the motors is obtained by acting on the excitation of the generator. The unit is heavy, space-consuming and noisy and of low efficiency (at the most 40%). The manufacture is not very reproducible, the characteristics of the metadynes having large variations as a function of the load. The slow speeds obtained are high and not very stable.

This technology is now considered to be out-dated.

(b) "The high voltage" is obtained by means of a raising static energy converter, namely a system having electronic switching which delivers the required power during the accelerations of the rotatable mass.

Such a device is illustrated in FIG. 1 in which a group 1 of batteries (in chassis) supplies a 24 V dc; the energy converter 2 connected to the group 1 is disposed for example in the turret of a tank and the motor 3 for driving the rotatable mass is connected to the converter 2.

The motor 3 is a dc motor with a separate excitation by magnets. Its torque coefficient K is therefore constant and determined as a function of the maximum speed.

For reasons of the behaviour of the electronic components of the converter 2, the output current must be limited to a value I. The maximum torque of the motor is therefore C=KI. When a full speed of the rotatable mass is required, the angular acceleration is:

$$\gamma = \frac{C}{J}.$$

J being the moment of inertia namely $$\gamma = \frac{KI}{J}$$

This value is constant so long as the current I remains at its maximum value. Further, the variable voltage at the terminals of the motor is:

$$U_{mean} = E + RI.$$

E being the c.e.m.f. and R the resistance of the armature. The voltage $U_{mean}$ being limited to the peak value available at the output of the converter 2, the term I diminishes when E is large, i.e. when the speed is high. The acceleration $\gamma$ as a function of the speed $\omega$ is therefore as shown in FIG. 2. The instantaneous power delivered by the motor is:

$$P = C\omega$$

FIG. 3 shows the variation in the power P as a function of the speed: in the part OA of the curve, the power increases linearly from 0 to the value $C.0.6\omega_{max}$. Thus it can be that the delivered power is smaller at low speeds. This is translated in the case of the rotatable mass by a slow increase in speed, whence a period for effecting a half-turn, which is excessively long compared with the time required for the homing of the tanks or modern carriages onto the target.

In order to overcome this defect, the torque C must be increased by increasing the current I, but this leads to the following drawbacks:

very large currents at the input of the converter, incompatible with the generators on most chassis. Indeed, values of 2,000 amps. are reached;

addition of space-consuming and expensive batteries or capacitors in the turret, in order to avoid these peaks of current through the rotating joint of the connection between the chassis and the turret;

electromagnetic disturbances by conduction in the high current supply line requiring the use of an expensive antiparasite system;

requirement of adding a second stabilized supply for the sophisticated firing conducting apparatus of present-day turrets, the voltage being too disturbed at the rotating joint;

the electronic power components at the input of the converter must result in a current of 2,000 amps. They are switching transistors which are expensive owing to their large silicon area; they are added to those employed in the H bridge which directly controls the motor and increases the total dissipated heat;

as the losses by eddy currents are proportional to the square of the intensity of the current, the overall efficiency is not high. As the converter is contained in a sealed case which must satisfy military temperature standards, its cooling requires a large heat dissipating surface or an additional forced ventilation. This results in an increase in the volume, the weight and the cost;

the cables of copper for connection with the generator are of large section; they do not lend themselves well to the structure of the turret owing to their lack of flexibility, and are connected to expensive connectors of large size;

the voltage of 2,000 V at the output of the converter may be considered to be dangerous to the crew of the machine and requires in any case the use of equipment satisfying 1,500 V insulation standards;

during the stage for braking the rotatable mass, its kinetic energy cannot be recovered in the batteries since the system is irreversible; it is converted into heat and increases the problems of thermal dissipation.

(c) In another known high-voltage control system diagrammatically represented in FIG. 4, the converter 4 is connected to a motor-generator 5 coupled to a kinetic energy accumulator (inertia flywheel). This motor-generator is mounted in the turret, as the converter 4, and supplies to the motor 3 its supply voltage through a chopper 6 (mounted in the turret).

The low-power 24 V/300 V converter 4 transmits the mean energy required for maintaining the rotation of the motor-generator 5 coupled to its flywheel, the assembly being mounted in the turret.

In order to avoid a catastrophic overall size, this assembly must rotate at high speed (more than 10,000 rpm) so as to store sufficient kinetic energy. The latter is employed for providing the power required during the accelerations of the rotatable mass. The motor 5 operating as a generator then supplies 300 V to the input of the chopper 6 with a maximum current of 100 amps., which also passes through the driving motor 3 having a constant excitation by means of magnets. Batteries of capacitors are necessary at the input of the chopper 6 in order to avoid excessive variations in voltage. The motor-generator 5 may be replaced by two machines: a 24 V motor and a 300 V generator, thereby dispensing with the converter 4.

The operation of the driving motor 3 is then identical to the foregoing case, i.e. the instantenous power at the shaft increases with the speed.

The drawbacks due the high currents are avoided. However, the following obvious weak points remain:

this equipment is very space-consuming and expensive, a converter, a special rotating assembly, and capacitors being added to the chopper. This prevents the mounting of such a system in turrets which have not been specially designed for receiving it;

the kinetic energy accumulator rotates permanently and constitutes, owing to its speed of rotation, a source of noise and vibrations;

problems due to the high voltage remain in their entirety;

the overall efficiency is low owing to the number of elements employed; in particular, in the case of a use of a stabilized turret, the mean power required at the output requires the generator of the chassis to deliver a higher mean current than in simpler systems.

(2) Low-voltage control of the rotation of the rotatable mass

In the low-voltage control device diagrammatically represented in FIG. 5, the chopper 7 (mounted in the turret) is interposed between the batteries and the driving motor 3. The motor 3, supplied with 20 V maximum, is of conventional design: its torque coefficient is constant and limited by the required maximum speed (the higher the latter, the smaller is the torque coefficient).

As this voltage is low, the output current must be very high in order to obtain an acceptable mean power. In instantaneous value, it indeed varies linearly as a function of the speed, as in the preceding systems:

$$P = C\omega,$$

the maximum torque C being constant and determined by the maximum value of the current I acceptable in the chopper 7.

Figure 6:
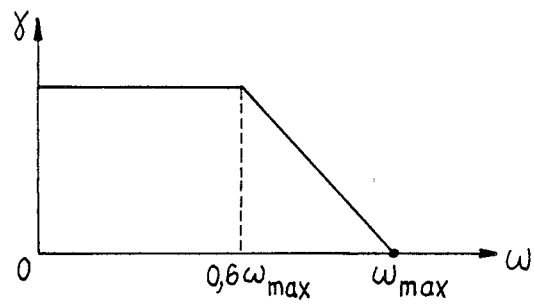
FIG. 6 is a diagram illustrating the acceleration as a function of the velocity of rotation of the rotatable mass with a driving system according to FIG. 5.

The curve of acceleration $\gamma$ as a function of the speed (FIG. 6) is therefore still the same.

Lack of performances in acceleration of this system will be easily understood if the instantaneous voltage U at the terminals of the motor is considered:

$$U = E + RI$$

As RI is constant during the acceleration, the voltage U varies as the c.e.m.f. E of the motor: it is a linear function of the speed. The output voltage of the chopper is thus low at low speeds and the chopper is badly used since it only delivers its maximum power at the end of the acceleration.

In order to compensate partly this defect, the current must be high both at the input and at the output of the chopper, and this results in all the drawbacks of high currents mentioned in the first device described hereinbefore with, in addition, the necessity to construct a converter having four quadrants of 1,000 amps. (with considerable costs as concerns the switching components).

An object of the invention is therefore to provide a device for driving the rotatable mass which does not have these various drawbacks.

According to the invention, the field system of the motor is formed by magnets and excitation coils, these two sources of magnetic energy being connected in series in the same magnetic circuit, and thus both acting on the same parts of the conductors of the armature, and the device is provided with an electronic system for controlling the current in the coils of the field system capable of maintaining during the accelerations and decelerations a maximum output voltage of the converter in a wide range of speeds, the current in the coils of the field system being unidirectional and the increase in its intensity progressively decreasing the torque coefficient of the motor which is maximum when the coils are not supplied with power.

As a numerical example to which the scope of the invention is not intended to be limited, for a dc source of 24 V, the maximum value of the intensity of the current in the armature may be set at about 580 amps. just below a value of for example 600 amps. for which the components are dimensioned. During the phases during which a high torque is required (accelerations and decelerations), the system maintains a maximum output voltage of the converter beyond a predetermined fraction of the maximum speed, for example 20%.

In one embodiment of the device, the magnets are four in number and made from a samarium-cobalt alloy, the conductor of each coil being wound around its pole piece according on surfaces parallel to the corresponding yoke portion so as to be capable of creating a magnetic induction in the same direction, but in a direction opposed to that of the corresponding magnet, and each magnet and its corresponding coil are placed one above the other between the yoke and axis of the motor, so as to cause both of them to act on the same parts of the conductors of the armature.

According to a preferred embodiment of the invention, the electronic control system for the current in the field system comprises:

a servo-control of the armature current at a predetermined maximum value;

a servo-control of the voltage of the armature at a predetermined maximum value;

and a chain for comparing the speed of rotation of the rotating mass with a low-speed setting for maintaining the torque coefficient at a maximum value at speeds lower than the set speed by maintaining at a zero value the current in the coils of the field system irrespective of the value of the current in the armature.

The driving device according to the invention has many advantages and in particular those of low-voltage systems and avoids the drawbacks due to the high currents, whence, in particular, a low dissipation of heat and a good efficiency at maximum power.

The device shown in the drawings is adapted to drive in rotation, and more precisely in lateral deflection, a rotatable mass of high inertia, such as a heavy tank turret or an anti-aircraft defense mount or carriage, this mass being capable of reaching about fifteen tons.

This device motorizing as concerns the lateral deflection the rotatable mass is completed by means (not shown for driving as concerns sight the pivotal mass. These driving means as concerns sight are indeed known and comprise for example: an electronic energy converter of 24 V-200 amps. of the chopper type in a H bridge having four quadrants and a dc motor with excitation brushes separated by samarium-cobalt magnets supplied with 24 V maximum power, an electronic unit controlling the chopper and regulating the speed of the motor by dynamo-tachometric means with a secondary current loop in the armature, safety systems and a gear-type speed reducer or a screw-type jack.

Figure 8:
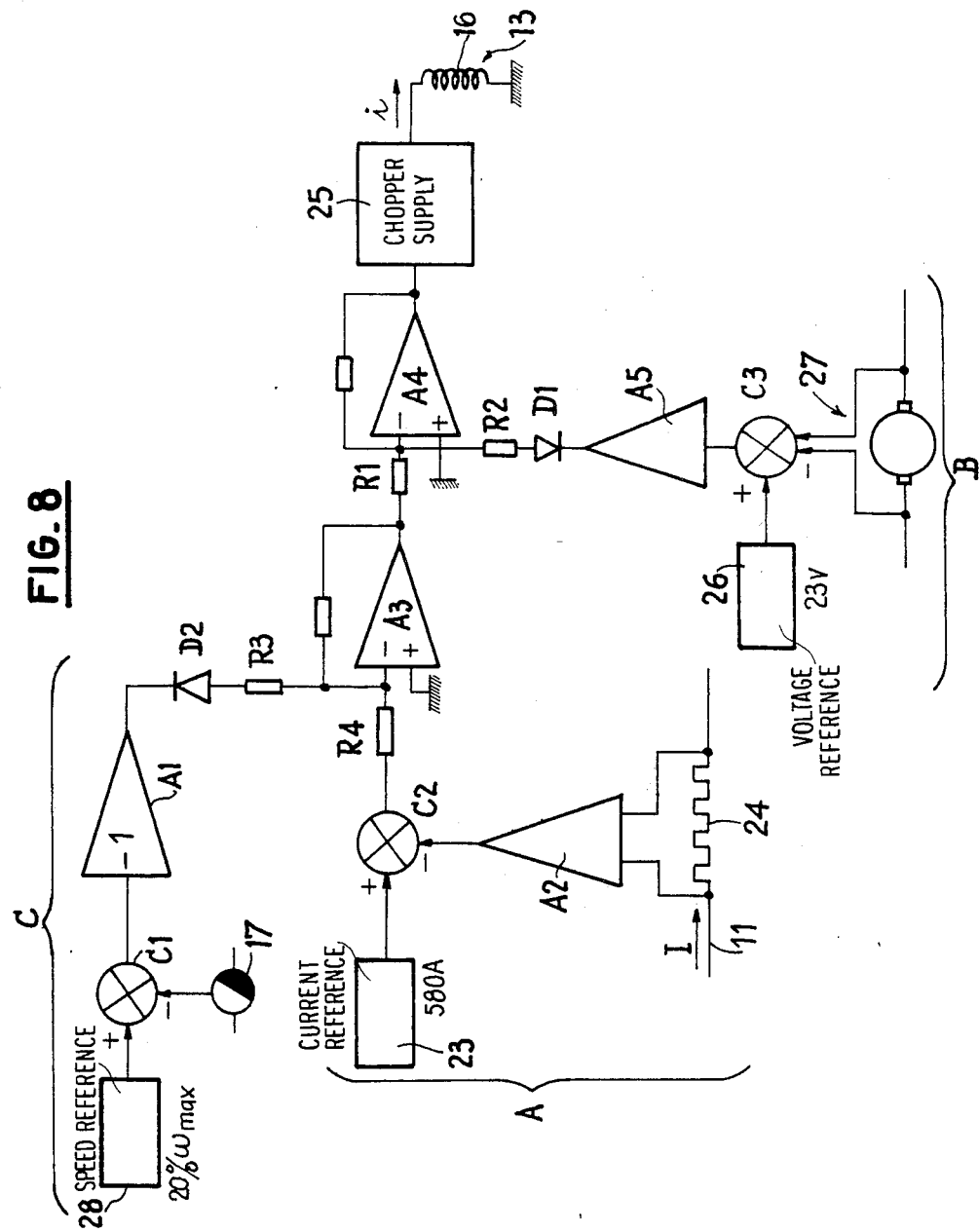
FIG. 8 is an electric diagram showing one embodiment of the control of the field system with servo-control of the current and the voltage of the armature (rotor) of the motor, at predetermined maximum values and the aforementioned comparison chain.
Figure 9:
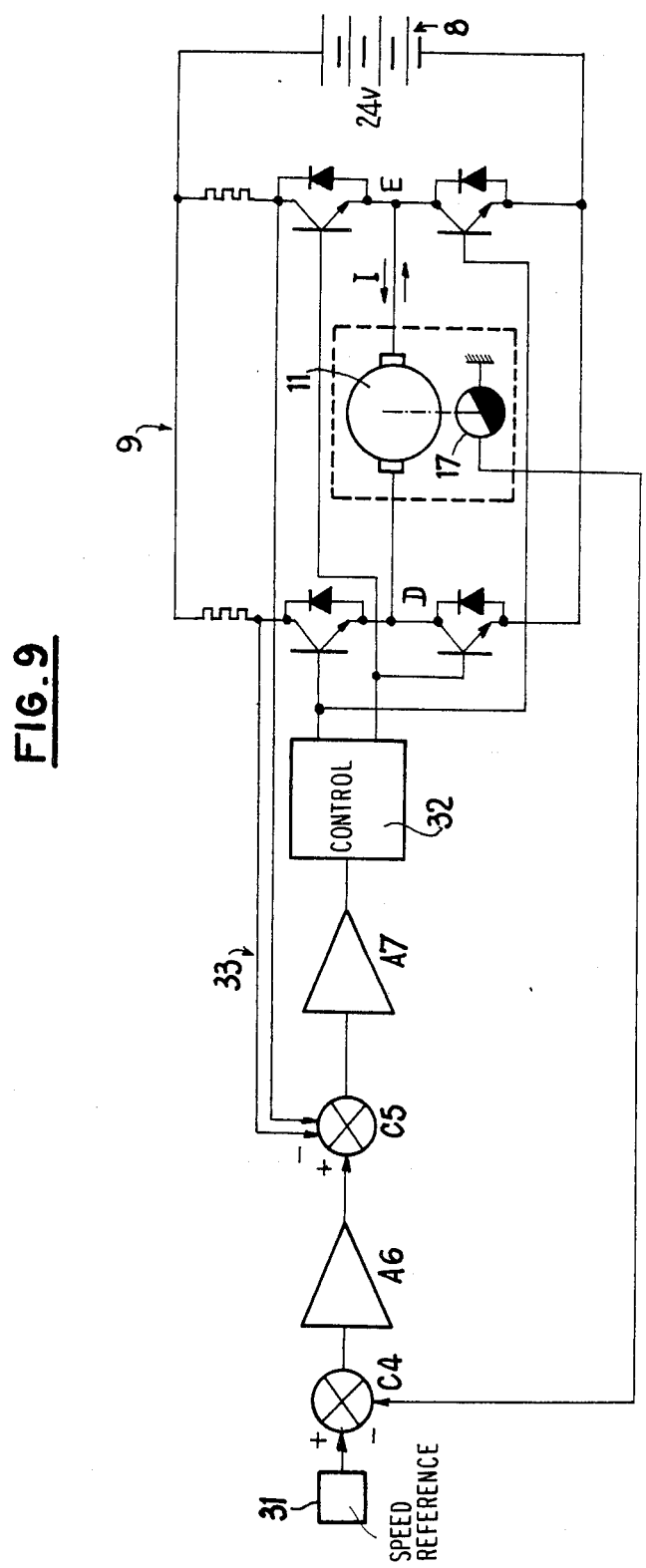
FIG. 9 is an electric diagram of the control of the armature of the motor.
Figure 10:
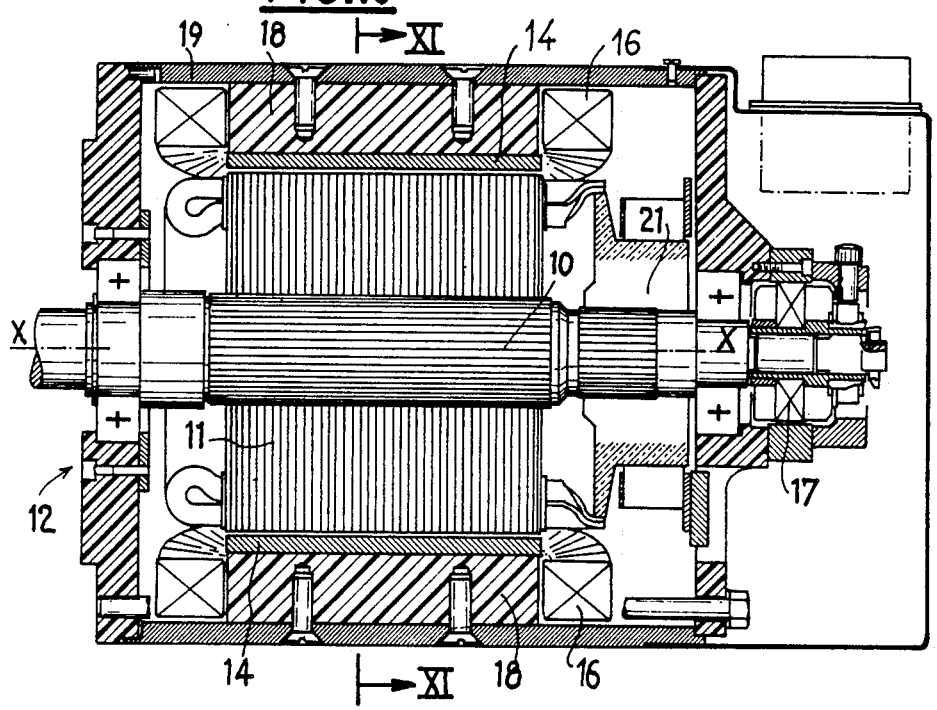
FIG. 10 is a semi-axial sectional view and semi-elevational view of one embodiment of the electric driving motor driving the rotatable mass according to the invention.
Figure 11:
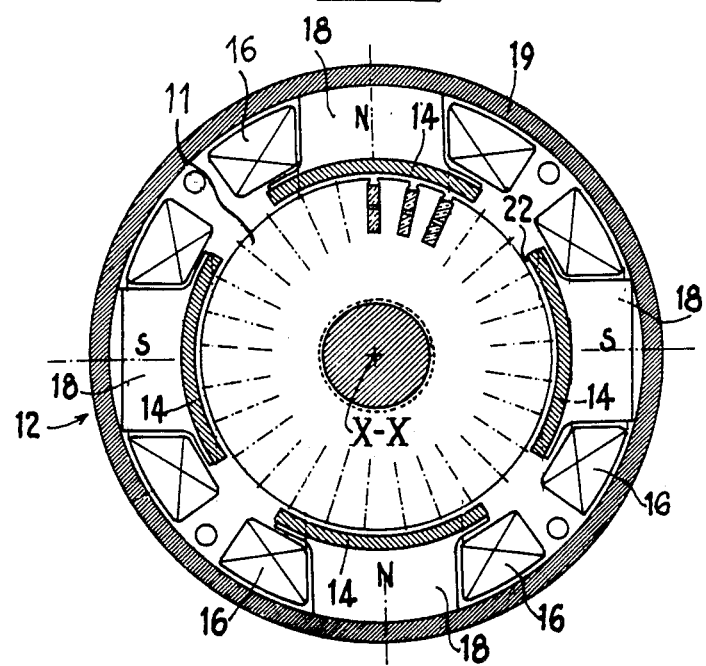
FIG. 11 is a cross-sectional view, taken in in plane XI—XI, of the motor shown in FIG. 10.

The motorizing device as concerns lateral deflection shown in the drawings comprises:

a source of dc power formed by batteries 8 mounted in the chassis of the machine;

a reversible electronic energy converter 9 of 24 V-600 amps. of the type including a chopper and an H bridge having four quadrants of continuous conduction adapted to supply power to the armature 11 (FIGS. 7, 8, 10 and 11) of a motor 12 shown in detail in FIGS. 10 and 11 and comprising a field system 13. The motor 12 has a variable separate excitation with brushes and is supplied with 24 V maximum power;

according to an essential feature of the invention, the field system 13 of the motor 12 comprises magnets 14 and exictation coils 16; the structure of this motor 12 will be described hereinafter in detail with reference to FIGS. 10 and 11;

an electronic system illustrated in FIG. 9 controlling the chopper 9 and regulating the speed of the motor 12 by dynamo-tachometric means 17, with a secondary current loop in the armature 11;

an electronic system for controlling the current in the coils 16 of the field system 13, capable of maintaining, during the accelerations and decelerations, a maximum output voltage of the converter 9, within a wide range of speeds. This current control system, an embodiment of which is shown in FIG. 8, comprises:

a/ a servo-control A controlling the intensity of the current I in the armature 11 at a predetermined maximum value;

b/ a servo-control controlling the voltage of the armature 11 at a predetermined maximum value;

c/ and a chain C for comparing the speed of rotation of the rotatable mass with a low set speed adapted to maintain the torque coefficient of the motor 12 at a maximum value at speeds lower than the set speed;

systems for starting up, safety, protection, anti-parasite and use of geometric data which are known per se and not shown in the drawings;

a gear-type speed reducer between the driving motor 12 and the rotating mass (not shown).

There will now be described in succession the various parts mentioned hereinbefore of the device according to the invention:

(1) Description of the electric motor 12 driving the rotatable mass (FIGS. 10 and 11)

Figure 7:
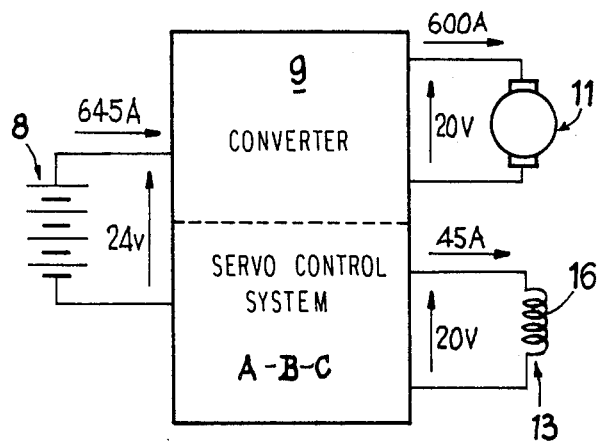
FIG. 7 is a simplified general electric diagram of one embodiment of the device for driving the rotatable mass in rotation, in accordance with the invention.

The motor 12 is of the dc 20 V-600 A type having brushes which have a variable separate excitation and its field system (stator), indicated by the general reference numeral 13 in FIGS. 7 and 8, comprises both permanent magnets 14 made for example from samarium-cobalt alloy, and a plurality of coils 16. The magnets 14, which are four in number in this embodiment, are adhered to the ends of the enlarged parts of the pole pieces 18. The electric conductor of each of the coils 16, which are also four in number, is wound around its pole piece 18 along surfaces parallel to the portion of the corresponding yoke 19, so as to be capable of producing a magnetic induction in the same direction but in a direction opposed to that of the magnets 14. The motor 12 also includes an armature or rotor 11 concentric with its shaft 10; the assembly being disposed within a cylindrical yoke 19. The motor 12 is provided in the known manner with a dynamo-tachometric means 17 and a collector 21, the other elements of the motor, shown in FIGS. 10 and 11, being known per se so that this motor need not be described in more detail. The magnets 14 and the excitation coils 16 constitute two sources of magnetic energy connected in series in the same magnetic circuit and thus both acting on the same parts of the conductors of the rotor 11. Further, the current in the coils 16 of the stator 13 is unidirectional and the increase in its intensity progressively reduces the torque coefficient K of the motor 12, which is maximum when the coils are not supplied with power. Moreover, each magnet 14 and its corresponding coil 16, are placed one above the other between the yoke 19 and the shaft 10, so that both act on the same parts of the conductors of the rotor 11.

The operation of the stator (magnets 14 and coils 16) is as follows:

(a) When the coils 16 are not supplied with power, the magnetic field is produced solely by the magnets 14. A flux passes through the yoke 19 and the poles 18 but, owing to magnetic leakages, only a fraction passes through the armature of the rotor 11: $\Phi_u$.

Figure 12:
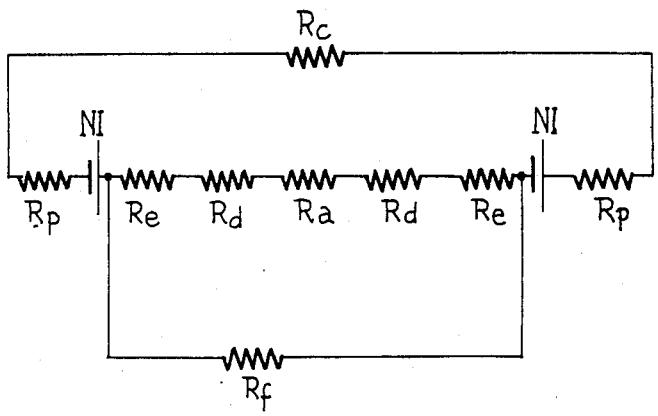
FIG. 12 is a diagram showing the magnetic circuit produced by a pair of poles of the motor shown in FIGS. 10 and 11, in which the magnets are replaced by flux generators.

By electric analogy, the magnetic circuit produced by a pair of poles 18 may be represented by the diagram shown in FIG. 12 where the magnets 14 are replaced by flux generators NI
with:
$R_c$ = reluctance of the yoke 19
$R_e$ = reluctance of the airgap 22
$R_d$ = reluctance of the teeth of the armature 11
$R_a$ = reluctance of the armature
$R_f$ = leakage reluctance
$R_p$ = reluctance of the pole pieces 18

The overall magnetomotive force is:

$$F = \Sigma F_i = 2NI$$

$\alpha$ being the leakage coefficient (about 1, 2), the effective flux which passes through the armature is:

$$\Phi_u = \frac{\Phi_p}{\alpha}$$

with: $\Phi_p$ = pole flux.

Further, the magnetomotive forces $F_i$ along the magnetic circuit (poles 18, airgap 22, teeth, armature and yoke 19) are calculated in the conventional manner with the use of the formulae:

$$F_i = R_i \Phi = H_i \times l_i = \frac{B^i}{\mu_i} \times l_i = \frac{\Phi_i l_i}{\mu_i S_i}$$

with:
$\Phi_i$ = flux in the considered portion of the circuit.
$l_i$ = length of the magnetic circuit portion of permeability $\mu_i$ and area $S_i$.

Further, the $\Phi_i$ are:

$$\Phi_c = \Phi_d = \Phi_u \text{ and } \Phi_e = \Phi_p$$

In adding all these magnetomotive forces, it is possible to deduce the number of equivalent ampere-turns NI of the magnet required per pole to obtain the flux $\Phi_u$ which is included in the formula determining the torque coefficient K:

$$K = \frac{P N \Phi_u}{a 2\pi}$$

with:
P = number of pole pairs
a = number of winding passages
N = number of active strands (b) The coils 16 connected in series are now supplied with power by means of the control system A,B,C of the field system 13 mentioned hereinbefore.

The direction of the current is such that the magnetic field created is in the direction opposed to that of the magnets 14. The number of ampere-turns per pole 18 is ni, n being the number of coils per pole piece. The resulting magnetomotive force is therefore:

$$NI - ni = a - bi$$

It decreases in proportion to the current i delivered to the coils 16.

$\Phi_u$ may therefore be modulated by acting on this current. In other words, the torque coefficient of the motor 12 is maximum when i is zero and decreases when i increases.

(2) Description of the electronic control system for the current in the coils 16 of the field system 13 (FIG. 8):

(a) Servo-control A of the intensity of the current in the armature 11.

The servo-control A comprises means 23 for setting the current at a value of 580 A, copying means formed by the reading and measuring of the current in the armature 11, namely a shunt 24 and an amplifier A2; a comparator C2, two amplifiers-inverters A3 and A4, a chopper supply 25 which is modulated as concerns the width of the pulse and is capable of delivering a undirectional current of 45A, the supply 25 being connected to the coils 16.

(b) The servo-control B of the voltage at the terminals of the armature 11 comprises the following elements: means 26 for setting the voltage to a predetermined fixed value of 23 V, means 27 for reading the voltage at the terminals of the armature 11, a comparator C3 of these two voltages, an amplifier A5, a diode D1 which has for function to neutralize the effect of the voltage chain when the counter electromotive force of the motor 12 is less than 28 V, the amplifier-adder A4, which is therefore common to the servo-controls A and B and connected to the chopper supply 25.

(c) The comparison chain C comprises means 28 for setting a fixed value of the speed of rotation ω of the motor 12 and of the rotatable mass, which is low relative to its maximum speed, for example 20% of the latter, means for reading the speed constituted by the dynamotachometric element 17, a comparator C1, an inverter A1 and a diode D2 connected to the output of A1. A resistor R1 is interposed between A3 and A4, a resistor R2 is interposed between the diode D1 and A4, a resistor R3 is placed between D2 and A3, and a resistor R4 is interposed between C2 and A3.

(3) Description of the control system of the armature 11 (FIG. 9):

The "power" part is constructed by means of the chopper 9, 24 V-600 A. The conventional design is that of an H bridge having four quadrants: two directions for the current and the voltage. It concerns consequently a reversible energy converter having a continuous bidirectional conduction with recovery of energy in the batteries when braking.

The speed of the rotatable mass is controlled by a main servo-control comprising the dynamotachometric element 17 (copying means) driven by the rotor 11 (armature), means 31 for setting the desired speed, a comparator C4, amplifiers A6 and A7 and a control 32 of the chopper 9.

This sytem also includes a secondary servo-control 33 of the current I in the armature 11, based on a comparator C5 interposed between the amplifiers A6 and 27, this secondary servo-control having for function to stabilize the whole of the servo-control chain irrespective of the value of inertia of the driven mass. The current information is also used for limiting the latter to 600 A.

The output voltage of the chopper 9 between the points D and E is modulated as concerns pulse width, its mean value being:

$$U_{mean} = E + RI$$

The definition which will be given hereinafter of the terms of this equation will show that this voltage depends on the speed and torque required of the motor. In an established operation, i.e. when the rotatable mass has reached the set speed, the output voltage of the chopper 9 is automatically at a value between 0 and 18 V.

Description of the operation of the lateral deflection driving device of the rotatable mass Control of the field system 11 (FIG. 8)

During the acceleration phases, the motor 12 has not yet reached the required speed. The amplifiers controlling the armature 11 are then saturated and the voltage at the terminals of the motor $U_{mean}$ is maximum and equal to 18 V, provided the current is less than 600 A.

This result is obtained by means of the servo-control A controlling the current in the armature 11 at 580 A, the operation of this servo-control being as follows : if the current I in the armature 11 has a tendency to decrease, the output voltage of C2 increases and that of A3 decreases, that of A4 increases, and the current i in the coils 16 increases. The torque coefficient K of the motor decreases and consequently the c.e.m.f E decreases.

Now, $U = E + RI$

As U is fixed and equal to 18 V, the current I increases and resumes the set value. There is thus achieved a regulation of the current in the armature 11 at 580 A.

During the decelerations, the current is reversed in the motor 12 and reaches the limitation value of 600 A. The servo-control A of the current A at 580 A then reacts and has for effect to decrease the current i in the coils 16 of the field system, and therefore increase the torque coefficient K. As the motor rotates rapidly at this moment, the c.e.m.f. E becomes high, and the current would be liable to become excessive, the conduction of this current occurring continously through the diodes (without possibility of limitation by the transistors). The servo-control B of the voltage of the armature 11 has therefore precisely for effect to limit the c.e.m.f. E to 28 V, the current being limited by the control of the transistors at 600 A. This regulation is achieved in the following manner:

If the voltage at the terminals of the motor 12 exceeds 23 V, the output voltage of A5 becomes negative, the diode D1 conducts, the output voltage of A4 increases irrespective of the state of A3 (the resistor R2 is weaker than R1), and the current i increases.

Therefore, the torque coefficient K decreases and the voltage of the armature 11 decreases.

During the phases in which a high torque is required (accelerations and decelerations), the device maintains an output voltage of the converter 9 maximum beyond about 20% of the maximum speed.

This is explained from the formula giving the instantaenous voltage U at the output of the chopper 9:

$$U = E + RI$$

where R=total resistance of the armature 11 and the cables.

The value RI is imposed and is about 5 V ; R is given by construction, and I is fixed at 580 A (value which may be adjusted in accordance with the power required of the equipment), just below the current limited to 600 A for which the components are dimensioned.

In order that U be maximum (about 18 V at the output of the converter), E must therefore be equal to:

$$E = U - RI = 18 - 5 = 13 \text{ V}.$$

Now, $E = K\omega$, with $\omega$ = speed and K = torque coefficient.

Therefore, in accordance with the speed, the torque coefficient must be adjusted to the value:

$$K = 13/\omega.$$

For this purpose, the current in the coils 16 of the field system is adjusted in such manner that the current in the armature I is equal to 580 A, by means of the servo-control A of this current the operation of which has been explained hereinbefore. If I increases, E increases.

Therefore, during the accelerations, E remains constant and equal to 13 V beyond 20% of the maximum speed: the more the speed increases, the more the torque coefficient K decreases.

The value of 20% is so chosen as to avoid imposing on the motor 12 an excessive torque coefficient at low speeds which moreover would only reduce the acceleration times by a negligible amount The power at the driving shaft 10 of the motor 1 is:

$$P = C\omega = EI$$

EI is constant and equal to 13×580, namely 540 Watts.

The motor is therefore controlled at maximum speed during a large part of the acceleration phase.

During the deceleration, the current is inverted in the armature 11, the motor 12 becomes a generator and returns current to the batteries 8 through the recuperation diodes of the chopper 9. This results in the relation:

$$E = U + RI$$

It is then no longer possible to limit the current at 580 A by increasing E. In order to avoid destroying the diodes, the maximum value of I is fixed at 600 A by ensuring that E remains at a value equal to the minimum voltage at the terminals of the batteries 8, increased by all the voltage drops (line, plus chopper 9, plus motor 12): 28 V. For this purpose, the voltage at the output of the chopper 9 is controlled by the set voltage given at 26 and equal to (28−RI), namely 23 V. This previously-described regulating servo-control B acts on the current in the field system when the output voltage of the chopper 9 increases up to 23 V (which is the case in particular when braking at full speed, the torque coefficient K increasing under the effect of the servo-control A of the current in the armature 11). The voltage servo-control B indeed has priority since its gain at the input of the adder A4 is higher.

A large part of the deceleration is thus effected at maximum power of EI = 28×600 = 17 kW.

Operation of the device at low speeds of rotation of the rotatable mass

At low speeds, the current i is zero in the coils 16, irrespective of the value of the current I in the armature 11.

This result is obtained by the comparison chain C in the following manner: if the speed is lower than 20% of the maximum value, this value of 20% being set at 28, the output voltage of A1 is negative, the diode D2 is conductive, and the output of A3 is then necessarily positive, R3 being lower than R4. The output of A4 is therefore negative and the current i in the coils 16 is zero.

If, on the other hand, the speed measured by the dynamotachometric element 17 is higher than the value set at 28 by 20% of $\omega_{max}$, A1 is positive and therefore separated by the diode D2 from the current servo-control A. The servo-control A then performs the previously-described function.

At low speeds, lower by 20% of the maximum speed, the torque coefficient K of the motor is thus maintained maximum, even if the current I is lower than the regulation value of 580 A. This mode of operation is justified by the fact that the coefficient K cannot increase beyond a certain value for reasons of construction. It can therefore maintain this high value, E will then be lower than 13 V, and the current may vary from 0 to its maximum limitation value at 600 A.

The rotatable mass is used for aiming at a target at low speed, and the motor rotates mostly at a low speed. The coils 16 then do not consume current.

As the torque coefficient of the motor is then high, the nominal current required for overcoming friction is as small as possible, and this results in a low consumption at the generator and low heating of the casings and motor.

The interest of this manner of operating resides in the fact that the motor 12, employed for aiming an armoured turret or anti-aircraft guns in lateral deflection, is in practice only used rarely with a low torque coefficient, i.e. with a high speed of rotation. Thus most of the time during the use of the device, the current i in the excitation coils of the field system 13 is zero, so that the winding can be very concentrated, the heating will be low and the overall size small.

Indeed, all of the components of the system for the two axes, other than the motor-speed reducers, may be in the form of one or two sealed cases cooled naturally by the surrounding air (the number being a function of the available space in the rotatable mass).

The approximate volume of the cases: 40 liters
The approximate weight of the cases: 45 kg
Weight of the sight motor: 15 kg
Weight of the variable excitation motor 12: 40 kg
Dimensions of the variable excitation motor with the dynamotachometric element 17: length = 320 mm, diameter = 220 mm.

It should be noted that the electronic system providing a regulated control of the field system 13 by the servo-controls A, B may be replaced by another device which permits obtaining the law of variation of the torque coefficient K in a different way.

$E_{max}$ being the maximum c.e.m.f. of the motor, constant and corresponding to 13 V, and the speed of the motor 12 being measured by the dynamotachometric element 17, there is obtained:

$$K = \frac{E_{max}}{\omega}$$

The control system is then equipped with an electronic divider which calculates the ratio $E_{max}/\omega$. The torque cofficient K depends moreover on the current i in accordance with the relation K = a − bi (a and b being constants which were mentioned previously as concerns the description of the motor 12). A calculator determines then the intensity of the current by carrying out the following operation:

$$i = \frac{a - \frac{E_{max}}{\omega}}{b}$$

The result is used as a setting order for the supply of power to the coils 16 of the field system so that, when the torque coefficient K must be high (at low speeds), the current i is zero, and that, inversely, this current has the required value at high speeds of rotation so that the coefficient K is low.

This sytem operates therefore as an open loop. However, it performs less well than the servo-control with closed loops illustrated in FIG. 8, since it cannot be used at each instant at the maximum of its possibilities. The law of variation of K as a function of i is indeed of little precision; moreover, $E_{max}$ is a constant calculated for a minimum battery voltage and which therefore cannot be optimized if the voltage provided by the generator is higher.

The advantages of the driving device for the rotatable mass according to the invention over prior known systems are the following, in addition to the advantages already mentioned:

small overall size and light weight;
number of components reduced to the minimum: case for the power and the servo-controls and driving motor;
low cost of manufacture;
recovery of energy when braking;
low sound level (no power supply in the rotating parts);
this device has all the advantages of the systems having a low voltage: immediate use of the existing generation without modification, low insulation voltage of the equipment and connectors, safety for the crew of the machine;
absence of drawbacks of high currents and consequently: low dissipation of heat, good efficiency at maximum power, level of disturbance in the supply line sufficiently low to avoid the necessity of the addition of a stabilized supply for the peripheral apparatus, small number of expensive "strong current" transistors, and cables of current section (100 sq. mm maximum);
low current in the motor at the aiming speeds;
moderate peak power required of the generator as compared to the obtained performances of acceleration: 14 kW. The converter 9 indeed delivers its maximum power during a large part of the rise in speed.

Example of utilization (a) inertia of the rotatable mass:
40 000 sq.m. kg
maximum speed: 1 rd/S
chosen reduction ratio: 1/350
torque coefficient of the motor 12: variable between 0.05 and 0.16 m.N/A.
maximum current in the field system 13: 45 A.

Figure 13:
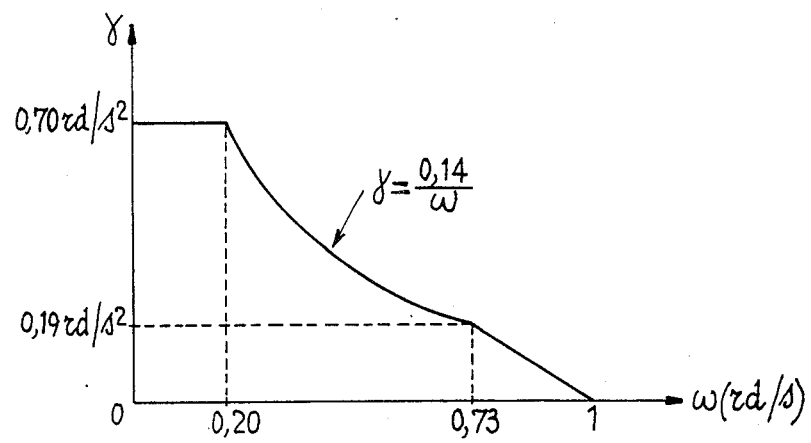
FIG. 13 is a diagram showing the acceleration as a function of the speed of rotation of the rotatable mass driven by a device according to the invention.

(b) The curve giving the acceleration γ as a function of the speed ω is then that illustrated in FIG. 13. The latter shows that the power is maximum and constant in the range 0.20–0.73 rd/s. The maximum torque is 33 000 mN.

Figure 14:
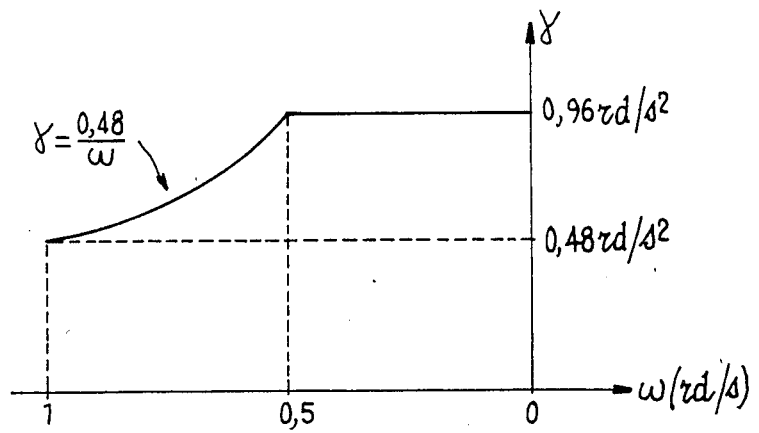
FIG. 14 is a diagram illustrating the deceleration curve beyond full speed with a device according to the invention.

(c) During the deceleration from full speed, the curve is that illustrated in FIG. 14. The braking power is maximum during the first half of the range of speed.

By way of example, the control device controlling the rotatable mass according to the invention enables a rotatable mass having an inertia of 40 000 sq.m.kg to effect a semi-revolution from stop-to-stop in about 5.5 seconds while avoiding, as explained hereinbefore, all of the drawbacks of the known prior systems.

The invention may be subjected to many modifications in construction: thus the number of coils of the field system 13 and the number of magnets 14 could be different from four as in the described embodiment, and the magnets could be made from alloys which are different from samarium-cobalt alloy.

What is claimed is:

1. An electric dc motor for driving a rotatable mass having a high inertia, comprising:
   (a) an electric motor having an armature (11) and a field system (13), said field system comprising at least two pole pieces (18) each including one permanent magnet (14) and one excitation coil (16), each magnet providing a first source of magetic energy and each excitation coil providing a second source of magnetic energy,
   (b) each excitation coil and its associated magnet being disposed one above the other between a yoke (19) and an axis of the motor such that both the first and second sources of magnetic energy produce a resultant magnetic energy which simultaneously acts on a same portion of the armature,
   (c) each excitation coil having an electric conductor wound around an associated pole piece and along surfaces parallel to an adjacent portion of the yoke to create a magnetic induction in a direction opposed to the direction of the magnetic induction of its associated magnet,
   (d) means for producing a unidirectional field current in said excitation coils, and
   (e) electrical energy converter means for supplying electrical power to said armature such that an increase in the magnitude of said unidirectional current progressively decreases the torque coefficient of the motor which is maximum when said coils are not supplied with current.

2. An electric motor according to claim 1, wherein said magnets are four in number.

3. An electric motor according to claim 1, wherein said magnets are made from a samarium-cobalt alloy.

4. An electrically controlled device for driving a rotatable mass having a high inertia, comprising:
   an electric motor having an armature and a field system, said field system comprising at least one permanent magnet providing a first source of magnetic energy and at least one excitation coil providing a second source of magnetic energy, and means for positioning said first and second sources in said motor such that magnetic energy produced thereby simultaneously acts on a same portion of the armature:
   electrical energy converter means for supplying electrical power to said armature; and
   field system control circuit means for controlling the current in said at least one excitation coil, said field system control circuit means including means for supplying a unidirectional field current to said at least one excitation coil having direction which produces magnetic energy which opposes the magnetic energy produced by said first magnetic energy source, and means, responsive to armature voltage and current, for controlling the magnitude of said unidirectional current to maintain the output voltage of said converter at a maximum value over a wide range of speeds during periods of acceleration and deceleration, an increase in the magnitude of said unidrectional current progressively decreasing the torque coefficient of the motor which is maximum when said coil is not supplied with current, wherein said field system control circuit comprises:

first servo-control means (A) responsive to changes in armature current for controlling the field current and thereby the motor torque coefficient to maintain the current in the armature at a predetermined maximum value;

second servo-control means (B) responsive to changes in the armature voltage for controlling thefield current and thereby the motor torque coefficient to maintain the voltage of the armature at a predetermined maximum value;

and a comparison means (C) for comparing the speed of rotation of the rotatable mass with a reference speed and for maintaining the field current at zero value when the mass rotation speed is below said reference value irrespective of the value of the armature current to thereby maintain the motor torque coefficient at its maximum value at mass rotation speeds below said reference speed.

5. A device as claimed in claim 4 further including a plurality of permanent magnets and a corresponding plurality of excitation coils, said means for positioning including means for positioning each of said magnets and a respective excitation coil in said motor so that each magnet and its respective excitation coil can produce magnetic energy which simultaneously act on the same portion of the armature; said means for positioning comprising a plurality of pole pieces equal in number to the number of magnetics, a permanent magnetic forming a portion of each pole piece with a respective excitation coil wound around each pole piece.

6. A device according to claim 5, wherein said magnets are four in number.

7. A device according to cliam 5, wherein said magnets are made from a samarium-cobalt alloy.

8. A device according to claim 4, wherein said first servo-control means (A) comprises means for detecting and measuring the current in the armature, a current reference source for supplying a reference current, a comparator, first and second amplifiers-inverters and a chopper supply connected to said at least one excitation coil of the field system.

9. A device according to claim 8, wherein the comparison means (C) conprises means for supplying a reference speed of rotation, means for detecting the rotational speed of said mass, a comparator means for comparing the reference speed with the speed of the mass, an inverter and a diode connected to said comparator and to the first servo-control means (A) for causing the output voltage of the second amplifier-inverter of said first servo-control means (A) to be negative and the current in the at least one excitation coil of the field system to be zero when the speed of the rotatable mass is lower than the reference value and for causing the diode to electrically separate the comparison means from the first servo-control means (A) when the rotational speed of the mass is greater than the reference speed.

10. A device according to claim 9, wherein said reference speed is 20% of the maximum speed of rotation of the motor.

11. A device according to claim 8, wherein said chopper supply includes pulse width modulating means.

12. A device according to claim 4, wherein the second servo-control means (B) comprises voltage reference means for supplying a voltage at a predetermined fixed value, means for detecting the armature voltage, a comparator, an amplifier connected to the comparator, an amplifier-inverter connected to the amplifier, and a chopper supply connected to said at least one excitation coil, whereby said second servo-control means (B) increases the intensity of the field current and consequently decreases the torque coefficient and thus the voltage of the armature if the voltage at the terminals of the armature exceeds the fixed value voltage, so that the voltage is regulated to said fixed value.

13. An electrically controlled device for driving a rotatable mass having a high inertia, comprising:

an electric motor having an armature and a field system, said field system comprising at least one permanent magnet providing a first source of magnetic energy and at least one excitation coil providing a second source of magnetic energy, and means for positioning said first and secnod sources in said motor such that magnetic energy produced thereby simultaneously acts on a same portion of the armature;

electrical energy converter means for supplying electrical power to said armature; and field system control circuit means for controlling the current in said at least one excitation coil, said field system control circuit means including means for supplying a unidirectinal field current to said at least one excitation coil having a direction which produces magnetic energy which opposes the magnetic energy produced by said first magnetic energy source, and means, responsive to armature voltage and current, for controlling the magnitude of said unidirectional current to maintain the output voltage of said converter at a maximum value over a wide range of speeds during periods of acceleration and deceleration, an increase in the magnitude of said unidirectional current progressively decreasing the torque coefficient of the motor which is maximum when said coil is not supplied with current, further comprising means for detecting the speed of the motor, an electronic divider for calculating $E_{max}/\omega$, $E_{max}$ being the maximum counter electromotive force imposed on the motor, and calculator means for calculating the intensity of the field current $$i = \frac{a - \frac{E_{max}}{\omega}}{b}$$

in which a and b are the constants of construction of the motor, the value of i thus calculated representing the intensity of the current sent to the coils of the field system so as to obtain a torque coefficient which is such that the output voltage of the converter is maximum.

14. An electrically controlled device for driving a rotatable mass having a high inertia, comprising:

(a) an electric motor having an armature (11) and a field system (13), said field system comprising at least two pole pieces (18) each including one permanent magnet (14) and one excitation coil (16), each magnet providing a first source of magnetic energy and each excitation coil providing a second source of magnetic energy, (b) each excitation coil and its associated magnet being disposed one above the other between a yoke (19) and an axis of the motor such that both the first and second sources of magnetic energy produce a resultant magnetic energy which simultaneously acts on a same portion of the armature, (c) each excitation coil having an electric conductor wound around an associated pole piece and along surfaces parallel to an adjacent portion of the yoke to create a magnetic induction in a direction opposite to the direction of the magnetic induction of its associated magnet, (d) means for producing a unidirectional field current in said excitation coils, (e) electrical energy converter means for supplying electrical power to said armature, and (f) field system control circuit means, including said means for producing a unidirectional field current in said excitation coils, for controlling the magnitude of said unidirectional current, in response to the armature voltage and current, to maintian the output of said converter means at a predetermined value over a wide range of speeds during periods of both acceleration and deceleration, an increase in the magnitude of said unidirectional current progressively decreasing the torque coefficient of the motor which is maximum when said coils are not supplied with current.

* * * * *